March 7, 1939. W. P. MORTON 2,149,538
METHOD OF PRODUCING BISCUITS
Original Filed May 26, 1936
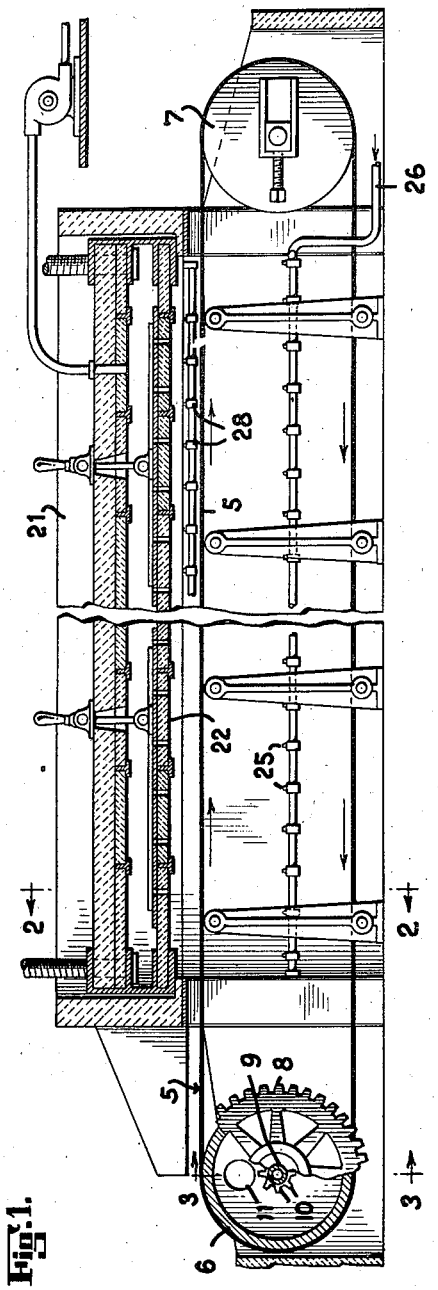
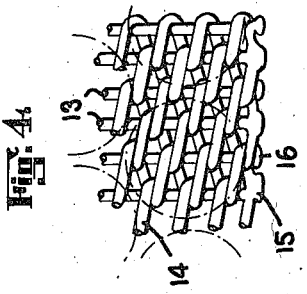
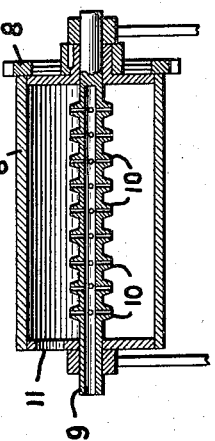
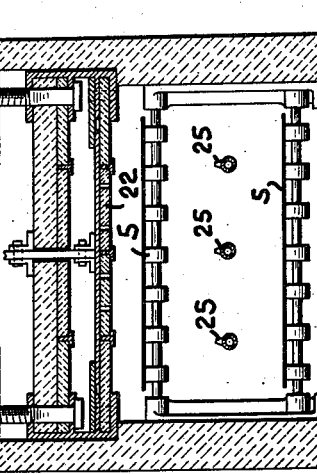
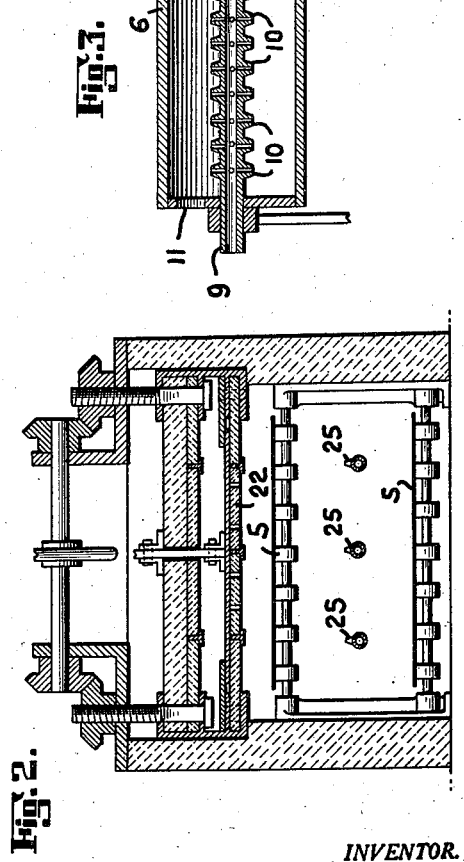
INVENTOR.
William Presley Morton
BY
ATTORNEY Patented Mar. 7, 1939

2,149,538

UNITED STATES PATENT OFFICE 2,149,538

METHOD OF PRODUCING BISCUITS

William Presley Morton, Indianapolis, Ind.

Original application May 26, 1936, Serial No. 81,836. Divided and this application December 18, 1937, Serial No. 180,528

5 Claims. (Cl. 107—54)

This invention relates to a method of producing biscuit and the like, and pertains particularly to the baking operations. This application is a division of my application filed May 26, 1936, Serial No. 81,836.

Among other objects, the invention is intended to provide a method for superior application of heat to the dough, to suit varying kinds and conditions. The invention is applicable with especial value in the baking of dough which requires a quick initial "spring", i. e., a sudden expansion of leavening gases and vaporization of moisture at the outset of the baking, as in those "sponge" doughs for soda crackers and the like.

One illustrative form of apparatus which may be used in practicing my method invention, is shown in the accompanying drawing, in which Fig. 1 is a diagrammatic side elevation of the major features of the apparatus;

Fig. 2 is a vertical section on the line 2—2 of Fig. 1;

Fig. 3 is a detached vertical section on the line 3—3 of Fig. 1;

Fig. 4 is a plan view of a fragment of an illustrative form of dough support.

The drawing shows an oven structure through which passes an endless conveyor 5 of special construction presently described. The conveyor is mounted upon a driven drum 6 and a second drum 7 at the opposite extremity of the oven. The drum 6 has fixed thereon a gear 8 to which is applied the drive, from any suitable source of power, for causing the conveyor to travel in the direction indicated by the arrows. The drum 6 and its gear 8 rotate upon a hollow shaft 9, through which heat is communicated to the interior of the drum 6 to maintain it at desired temperature, and thereby to aid in keeping the conveyor at the temperatures desired, as presently explained. For example, the hollow shaft 9 may be connected with a source of fuel which may pass through the jets 10, and may be ignited through the aperture 11 in one end of the drum. A regulating cock (not shown) will be provided in the fuel conduit so that the heat in the interior of the drum 6 may be governed to maintain proper temperature and to vary it to suit different requirements.

The conveyor 5 is of distinctive character and exemplifies structurally and functionally a preferred type of dough-support which lends itself to the practice of my method when combined with appropriate oven elements and sources of heat. The distinctive dough-support, illustrated by the conveyor 5, is formed of metal or a composite of metal pieces having relatively high thermal capacity, and its dough-supporting surface is equipped with a multitude of passages permitting escape of vapor from the bottom face of the dough. For example, the conveyor 5 may be composed of steel of such structure and dimensions that it weighs approximately five to eight pounds per square foot of supporting area. In steel, this mass suffices to supply the desired thermal capacity which, rather than any range of absolute weight of metal, is a primary desideratum. The particular construction of dough-support shown in the fragmentary plan view of Fig. 4 is especially advantageous: it comprises transverse bars 13 extending across the width of the support, interconnected by coiled bars 14 resembling somewhat, in mechanical principle, the sort of conveyor belt shown in Fig. 1 of the patent to Edward Pattee, No. 1,204,816 dated November 14, 1916. The edge of the support may be formed by spot welding together the extremities of the coiled bars 14 and the transverse bars 13, as indictaed at 15, and the alternating bars 13 may be headed as indicated at 16. The cross sections of the bars 13 and 14, the dimensions and pitches of the coils, and the coordination of the transverse and coiled bars, when these are formed of steel wire, are such that the support weighs approximately five to eight pounds or more per square foot of supporting area. In this form of support, the interstices between the bars supply passages for the escape of vapor from the bottom face of the dough.

For reasons later explained, in some aspects of the invention it is preferred that the biscuit or the like deposited upon the dough-support be in separate pieces, for the respective biscuit, with edges spaced apart sufficiently to permit free circulation of heat uniformly around the periphery of each biscuit and between contiguous biscuits. In Fig. 4 the dot and dash circles, respectively, indicate individual biscuit as they may be deposited on the conveyor, spaced apart so that currents of hot air passing through the interstices of the conveyor may completely encircle each biscuit with substantial uniformity. The bars 14 may be of any desired cross section, and the convolutions of their coils may have more or less curvature with the result that the supporting surface of the conveyor is composed of numerous small separated surfaces against which the biscuit have contact along rather narrow lines or at individual points. The specific bars 14 of Fig. 4 are circular in cross section, which is one desirable form. When the biscuit are thus supported upon the irregular surface of the conveyor, each biscuit being positioned over and substantially encircled by interstices in the conveyor, there is opportunity for the direct application of heat through the interstices of the conveyor to the under surface of each biscuit, and also for the relatively free circulation of heat across the whole under surface of each biscuit and around its edges.

The illustrative form of oven structure comprises the walls 20, 21 surrounding the oven chamber, through which passes the conveyor 5, the ceiling of the chamber being supplied by a more or less horizontal wall 22 formed of slabs of firebrick or the like. In the lower part of the chamber are the burners 25, 25 which illustrate any practicable source of heat for creating and maintaining desired temperatures in the chamber. For example, the burners 25 may be supplied with fluid fuel through the pipe 26. Additional burners 28 may be located between the conveyor 5 and the ceiling 22. In some instances it is preferable to supply these burners 28 in the vicinity of the discharge end of the oven so that the heat from them may contribute to the later stages of the baking of the biscuit.

In baking some kinds of biscuit, considerable moisture is expelled from the dough in the form of steam. The steam emerges from both the top and under surfaces of the dough. When the dough rests upon an imperforate hot plate or conveyor, the steam at the under surface of the dough is likely to be trapped between it and the plate and to form concavities in the dough, largely because there is no adequate opportunity for the steam to escape. The result is that the under face of the baked dough is pitted by irregular pockets, frequently of considerable size and the dough is unevenly baked and browned on its lower surface partly because the trapped moisture or steam somewhat insulates the dough from the heat of the plate. These defects in method and product are avoided or minimized in practicing the present invention because the steam can readily escape from beneath the dough through the passages formed by the irregular surface of the conveyor, and also because the perforations or interstices in the conveyor serve as miniature chimneys for currents of hot air or gases which may impinge against the under surface of the dough, flow through the described passages and carry away the steam, instead of leaving it trapped beneath the dough. The relatively high thermal capacity of the metal in the conveyor enhances these beneficial effects by maintaining a substantial heat supply adjacent the dough to aid in maintaining the currents to carry away steam.

It has been a familiar practice in the prior art to form docker holes in the dough, one object thereof being to cohere the top and bottom skins of the dough, at intervals, for purposes well understood in the art. When the docker holes pass through the dough, they aid the escape of steam which otherwise would be trapped under the dough; but these docker holes alone do not adequately avoid this trapping of steam beneath the dough or the resulting defects in the baking and the product. When docker holes are employed in the use of this invention, there is a direct co-operation between the docker holes and the passages in the surface of the dough-support or the interstices passing through it, such that the former function as continuations of the steam-escape passages and facilitate the flow of the described currents which carry away the steam.

When an imperforate oven plate or band is employed, the air and moisture above it has a tendency to be more or less inert and to become stratified in layers of different respective temperatures, with the result that excess moisture or steam may be present at the upper surface of the dough and may cause an objectionable glaze or crust on the top surface which interferes with proper escape of moisture or steam from the dough. But in the use of a heavy heat-retaining conveyor having numerous passages or interstices, the induced currents or draughts at and across the under surface of the dough, and around individual dough-biscuit when they are segregated, and through docker holes when they are employed, help to carry away the moisture or steam from the vicinity of the top surface of the dough and to break up the tendency of the air to stratify.

In the practice of the method and the use of the apparatus illustrated in the foregoing description, numerous important purposes are achieved. The relatively high thermal capacity of the metal in the dough-support 5 supplies a heat reservoir so that when the conveyor is heated to the desired degree, prior to the deposit thereon of the comparatively cold dough, the content of heat in the metal suffices efficiently to give to the dough the desired quick "spring", i. e., the expansion of the leavening gases and the vaporization of a considerable part of the moisture in the dough. If a body of metal of substantially lower thermal capacity were employed, its heat content would be too quickly and ununiformly dissipated upon contact with the colder dough, with the result that the application of heat to the dough would not be sufficiently uniform or continuous to produce the desired "spring".

By the use of a dough-support having the functional character of that shown in Fig. 4, and having the described high thermal capacity, the initial quick "spring" of the dough is promoted not only by the adequate heat content of the metal which is communicated to the dough mainly by conduction and radiation, but also by convection currents and radiation originating at the source of heat (e. g., the burners 25) and passing through the interstices of the conveyor to impinge against the bottom surfaces of the dough, and to encircle each dough piece when the pieces are spaced apart on the support. In the baking of some kinds of dough, a critical time in the operation arrives when the cold dough is first deposited upon the conveyor. According to one preferred practice of this invention, at that critical time the three modes of heat communication may be brought to bear with the highest efficiency; i. e., conduction, convection and radiation. At the same time, because of the meshed structure of the conveyor, a large aggregate surface of the metal is brought into play, and this serves the two-fold purpose that the heat content of the conveyor is speedily replenished against the tendency of the cold dough to consume the heat, and also the multiple surfaces of the metal radiate heat and initiate convection currents immediately adjacent the dough. In this way, there is an important practical coordination of the meshed conformation of the conveyor which exposes multiplied areas of metal, the substantial thermal capacity of the support, and the functioning of the passages or interstices which contribute largely to the result.

A further contribution derives from the heating of the drum 6, which may maintain the heat content of the conveyor when it is more or less exposed at the entrance end of the oven, so that at the critical time of the deposit of the dough the proper temperature of the conveyor may be insured.

Another factor is the radiation and reflection of heat downwardly from the ceiling 22.

It has been recognized in the prior art that substantial bodies of heat-retaining metal are desirable to be used in oven plates and the like, to promote the quick initial "spring" of some kinds of biscuit dough. It has been generally considered that metal oven plates (for soda crackers, for instance) should be of about 10 gauge thickness, i. e., about .14 inch thick, to have the neeed heat-retaining capacity. In the practice of this method it is feasible to employ a dough-support of approximately the same thermal capacity as that of a 10 gauge steel plate.

As will be evident to those skilled in the art, the above-described illustrative method may be modified in numerous particulars, within the scope of the subjoined claims. In one aspect the method is especially useful in baking segregated dough-biscuit, but it may be used with great advantage in baking peels or sheets of dough.

I claim:

1. A method of baking biscuit-dough, characterized by applying heat to the dough by substantially continuous uniform conduction at numerous separated points on the bottom face of the dough, applying heat to the bottom face of the dough intermediate said points, and inducing currents across the bottom face of the dough between said points to carry off moisture.

2. A method of baking biscuit-dough, characterized by applying heat to the dough by substantially continuous uniform conduction at numerous symmetrically-arranged separated points on the bottom face of the dough, and applying heat to the bottom face of the dough intermediate said points.

3. A method of baking biscuit-dough, characterized by applying heat to the dough by substantially continuous uniform conduction at numerous separated points on the bottom face of the dough, while leaving exposed areas between said points on the bottom face of the dough, and inducing currents along said exposed areas to carry off moisture.

4. A method of baking biscuit-dough, characterized by forming individual biscuit-pieces from a dough sheet and assembling the pieces with their edges spaced apart, applying heat to the biscuit-pieces by substantially continuous uniform conduction at numerous separated points on the bottom face of each piece, applying heat to said bottom faces intermediate said points, and inducing currents across said bottom faces and around the edges of the biscuit-pieces, to carry off moisture.

5. A method of baking biscuit-dough, characterized by forming individual biscuit-pieces from a dough sheet and assembling the pieces with their edges spaced apart, applying heat to the biscuit-pieces by substantially continuous uniform conduction at numerous separated points on the bottom face of each piece, applying heat to said bottom faces intermediate said points, and inducing currents across said bottom faces and substantially surrounding each biscuit-piece.

WILLIAM PRESLEY MORTON.